(12) United States Patent
Chellali et al.

(10) Patent No.: US 6,269,154 B1
(45) Date of Patent: Jul. 31, 2001

(54) SPLITTERLESS MODEM WITH INTEGRATED OFF-HOOK DETECTOR

(75) Inventors: Adam M. Chellali, Richardson, TX (US); Yaqi Cheng, Las Vega, NV (US); Walter Y. Chen, Franklin, MA (US); Michael O. Polley, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/244,604

(22) Filed: Feb. 4, 1999

Related U.S. Application Data
(60) Provisional application No. 60/073,644, filed on Feb. 4, 1998.

(51) Int. Cl.$^7$ .................................................. H04M 11/00
(52) U.S. Cl. ..................................... 379/93.28; 379/93.31; 379/93.09
(58) Field of Search .............................. 379/93.29, 93.28, 379/93.31, 93.33, 93.09; 375/222

(56) References Cited

U.S. PATENT DOCUMENTS 6,061,392 * 5/2000 Bremer et al. ........................ 375/222
6,151,335 * 5/2000 Ko et al. ............................... 370/487

* cited by examiner

Primary Examiner—Stella Woo
(74) Attorney, Agent, or Firm—J. Dennis Moore; W. James Brady, III; Frederick J. Telecky, Jr.

(57) ABSTRACT

A splitterless DSL modem (200) with an integrated off-hook detector (260) prevents data loss and/or disconnections as a voiceband device (154) coupled to the same transmission line (150) transition between steady states. The splitterless DSL modem (200) include a DSP (260), an interface (250) to a twisted pair wire line (150), signal converters (220, 222), and various filters (230, 240). The off-hook detector circuit (260) can be coupled to the interface (250) on the analog side of the DSL modem (200) or on the digital side of the signal converters (220, 222).

17 Claims, 2 Drawing Sheets

SPLITTERLESS MODEM WITH INTEGRATED OFF-HOOK DETECTOR

RELATED APPLICATION

This application claims benefit of Provisional of application Ser. No. 60/073,644 filed Feb. 4, 1998.

This application is related to U.S. patent application Ser. No. 09/216,082 by Ibrahim, Polley, and Payne entitled "Residential Power Cutback for Splitterless DSL Operation," filed Dec. 18, 1998, the entirety of which is incorporated herein by reference.

TECHNICAL FIELD

The invention relates generally to modems, and more particularly to a means by which a remote splitterless DSL modem maintains a high quality communications link to a central office modem by rapid detection of ring events, on-hook to off-hook transitions, on-hook to off-hook transitions preceded by ring events, and off-hook to on-hook transitions, followed by rapid configuration of modem operating parameters to minimize errors and disconnects.

BACKGROUND OF THE INVENTION

The increased use of telephone twisted pair wiring for data communications has resulted in a push for faster modems and improved signaling protocols compatible with the public switched telephone network (PSTN). Examples of such improved protocols include the emerging modem communication standards which have pushed the limit of transmission speeds close to 56 Kbps. Other examples include the emerging variety of digital subscriber line (DSL) communications protocols—including asymmetric digital subscriber line (ADSL), symmetric digital subscriber line (SDSL), hi-bit rate digital subscriber line (HDSL), and very high rate digital subscriber line (VDSL). Each DSL variant represents a different transmission speed over a different distance of copper pair wiring. Currently, industry is manufacturing communication equipment capable of implementing one or more of the DSL protocols. Modems, routers, line cards, and digital loop carrier systems are all examples of such equipment.

Theoretically, a DSL modem and a plain old telephone system (POTS) or other voice band device should be able to operate simultaneously over the same wire line pair since they use different frequency bands. Splitterless modems try to take advantage of this principle to transmit both voice band and digital DSL signals simultaneously. An example of such a splitterless modem architecture is disclosed in related U.S. patent application Ser. No. 09/216,082 (the "Related Application"), entitled "Residential Power Cut-back for Splitterless DSL Operation".

The Related Application discloses a splitterless DSL modem capable of operating in at least two steady states: one during which normal DSL data transmission occurs and another in which voice transmissions occur simultaneously with DSL. The modem can also operate in a "transient" state that occurs in the brief time it takes to transition from one of the first steady states to another.

Unfortunately, the connection of a POTS to the same wire line pair as a DSL modem can suffer from several problems that occur during the presence of transient signals. One transient, called the "off-hook transient" can cause data disruptions and/or a disconnect from the line. Typically, the off-hook transient occurs as the POTS device coupled to the same wire line pair goes from the on-hook condition (handset down) to the off-hook condition (handset up) or state. Thus, the activation of the POTS device creates an off-hook transient that may appear as a spike or other signal form over the wire line pair coupling both the DSL modem and the POTS device to the central office. Other transients, including on-hook and ring signals may cause similar problems.

The Related Application discusses other changes in line conditions such as a change in the line impedance as the POTS changes states. While such changes in line condition can be short-lived, they oftentimes interrupt or disconnect the DSL modem from the line and cause data to be lost. It would therefore be advantageous to have a system and method of accommodating changes in line condition that occur as a POTS device coupled to the same line as the DSL modem goes from one steady state to another. A system and/or method of preventing data loss and/or disconnects due to transients would provide many benefits in the context of a DSL environment.

SUMMARY OF THE INVENTION

The present invention is a solution to the problems associated with transient signals that permits concurrent operation of a plain old telephone system (POTS) device, such as a facsimile, telephone or other similar voiceband device that operates within the traditional voiceband and a digital subscriber line (DSL) modem to prevent disconnects of the DSL modem, the unrecoverable loss of data, or other disruptions of a DSL session. The present invention thus enables a customer to plug the splitterless DSL modem in any normal telephone phone jack similar to the way voice band modems are installed today.

According to one embodiment, disclosed is a system for transient and ring signal detection in a splitterless DSL communications system in which a DSL modem and a POTS device operate together over the same wire line pair. The system includes a splitterless DSL modem at the remote end of a communications link with an integrated transient and ring detector circuit or other similar means of detecting transients and ring signals. The remote splitterless DSL modem includes a digital signal processor (DSP), a hybrid interface to the wire line pair, and a signal converter circuit. The splitterless DSL modem may also include various filters for appropriate bandwidth filtering.

In one embodiment, the transient and ring detector circuit is coupled to the hybrid interface on the analog side of the DSL modem. The transient and ring detector circuit may also be connected on the digital side of the signal converter thus providing for both digital and analog hardware as well as software implementations of the system.

Also disclosed is a splitterless DSL modem having a means of transient and ring signal detection. The splitterless DSL modem include a DSP, a hybrid interface to a twisted pair wire line connection, a D/A converter, an A/D converter, and various filters as appropriate for bandwidth filtering. The transient and ring detector circuit is coupled to the hybrid interface on the analog side of the DSL modem in one embodiment. The transient and ring detector may also be coupled on the digital side of the D/A and A/D converters.

Further disclosed is a method of preventing a splitterless DSL modem from disconnecting or losing data due to transients during a DSL communication session. The method can be employed across a link coupling both a voice band device and a DSL modem to a central office facility. The method includes the step of detecting when a ring signal from the central office is transmitted over the link. Next, if this is the first time a ring signal has been detected, the DSL modem computes a set of operating parameters corresponding to a first (typically the on-hook steady state) steady state of the voiceband device; otherwise, the DSL modem recalls a set of operating parameters previously computed and stored for the first steady state. Next, when a transition to a second steady state is detected, a set of operating parameters corresponding to a second steady state are recalled or, if this is the first time the transient has been detected, the operating parameters are generated for the first time, stored and utilized following detection of the transient signal. Likewise, operating parameters that correspond to the first steady state are stored, recalled and utilized when a transient preceding a change to the first steady state is detected.

The method may also include any one of the following steps: detecting the start of a transient and reacting immediately to prepare both remote and CO modems for further effects of the transients and for calculating a set of new operating parameters for the second steady state; alerting both the splitterless remote DSL modem and the modem in the central office that a transient has occurred; placing the central office modem on stand-by. As discussed in the Related Application, examples of the type of operating parameters which may be computer, stored, recalled and utilized include the equalizer filter coefficients, frame alignment variables, and bit loading parameters among others.

BRIEF DESCRIPTION OF THE DRAWINGS

Other aspects of the invention including specific embodiments are understood by reference to the following detailed description taken in conjunction with the appended drawings in which.

References in the figures correspond to like references in the detailed description unless otherwise indicated.

DETAILED DESCRIPTION OF PREFERRED EMBODIMENTS

The present invention provides an architecture for a DSL modem that accommodates changes in line condition that occur as a POTS or other voiceband device coupled to the same line as the DSL modem goes from one steady state to another to prevent data loss and/or disconnects due to transients.

Figure 1:
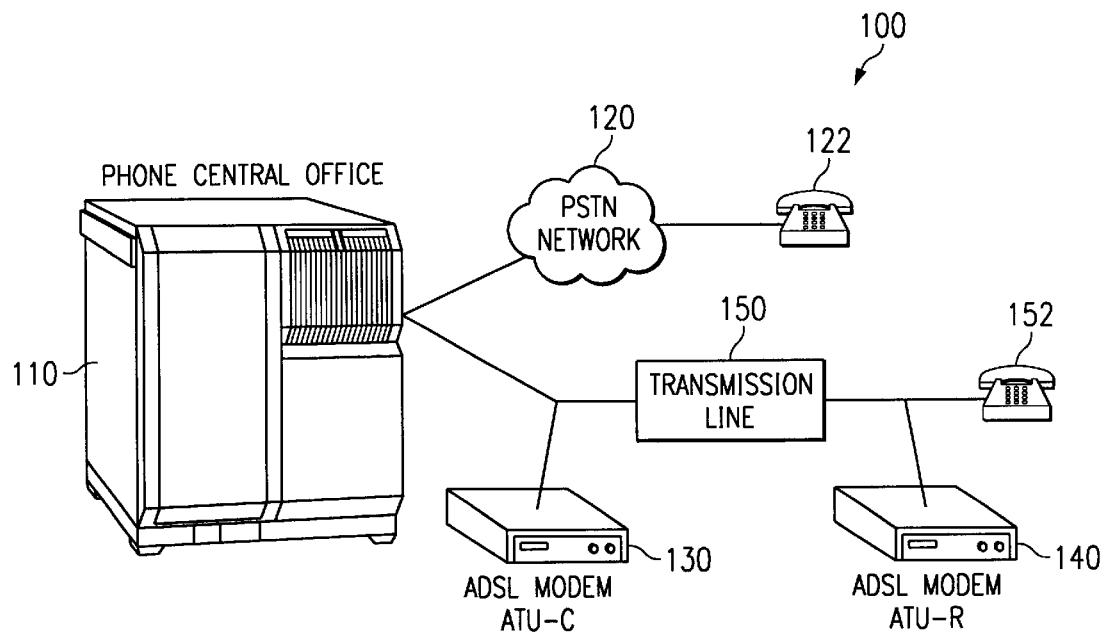
FIG. 1 illustrated the general configuration of a telecommunications network having a splitterless remote (residential) DSL modem and POTS device connected to the same wire line pair leading to a central office.

Referring to FIG. 1, therein is shown a block diagram of a communications network 100 having a splitterless remote (or residential) DSL modem 140 and a plain old telephone service (POTS) device or telephone 152 operating on the same transmission line 150 (the terms POTS, telephone and or voiceband device are used interchangeably throughout). Typically, the transmission line 150 comprises twisted pair wiring of the type found in many public switched telephone network (PSTN) installations. The network 100 shows a far end telephone 122 coupled to the PSTN 120 which, in turn, leads to the central office (CO) 110. The CO 110 is capable of routing calls from the far end telephone 122 to the near end telephone 152 across the transmission line 150.

A remote (or residential) splitterless digital subscriber line (DSL) modem (DSL, ADSL Transceiver Unit-Remote, or ATU-R are used interchangeably throughout) 140 shares transmission line 150 with the telephone 152. The ATU-R 140 communicates with a CO ADSL modem (ADSL Transceiver Unit-Central office, or ATU-C) 130. Since the ATU-R and the telephone 152 utilize different frequency bands, they should be able to communicate across the same transmission line 150 at the same time. One example of the techniques required to properly operate both devices is disclosed in the Related Application, while additional details may be found in the ITU 992.2 specification for G. Lite.

The problem, however, is that as the telephone 152 or other voiceband device coupled to the transmission line 150 goes off-hook or on-hook, a transient is created across the transmission line 150. Oftentimes, the transient manifests itself as a voltage spike across the transmission line 150 that can disrupt the transfer of data and/or cause the DSL modem 140 to drop the connection. Other changes in the condition of the transmission line can cause similar problems.

Figure 2:
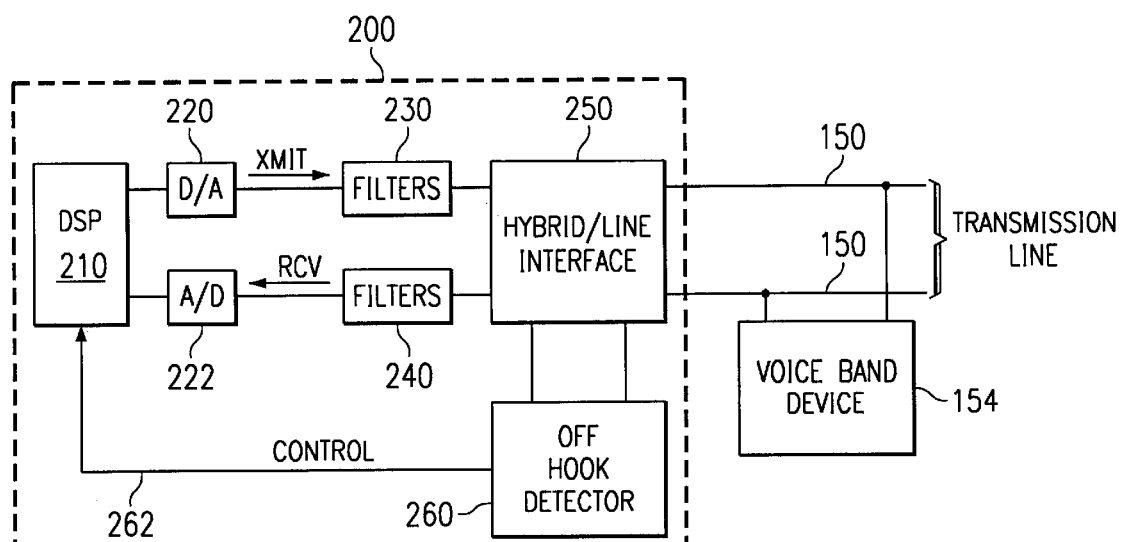
FIG. 2 is a block diagram of a remote splitterless DSL modem at a client site (ADSL Transceiver Unit-Remote, or ATU-R) having an integrated transient and ring detector circuit.

FIG. 2 is a block diagram of a splitterless DSL modem 200 suitable for use as the ATU-R 140 in the communications network 100. The splitterless DSL modem 200 is coupled to the transmission line 150. Also coupled to the transmission line 150 is the POTS device 154 which represents any one of various components operating within the voiceband including telephones, facsimile machines, voiceband modems or other similar devices designed to work within the POTS frequency band.

The DSL modem 200 includes a line interface 250 which is often configured as a hybrid providing a coupling mechanism between the two wires of the transmission line 150 and the receive and transmit paths into the digital signal processor 210 of the DSL modem 200.

As discussed in the Related Application, the impendence seen by the DSL modem 200 on the transmission line side of the interface 250 is affected largely by the on-hook or off-hook status of the POTS device 154. According to the Related Application, the DSL modem 200 is capable of calculating a set of transmission line coefficients corresponding to each one of the states in which the POTS device 154 operates. The present invention is an architecture for a DSL modem 200 with an integrated off-hook detector circuit 260 capable of determining when the POTS device 154 transitions between any one of two steady states and one transition state: the off-hook state and the off-hook state respectively and an intermediary state between these two steady states.

Figure 3:
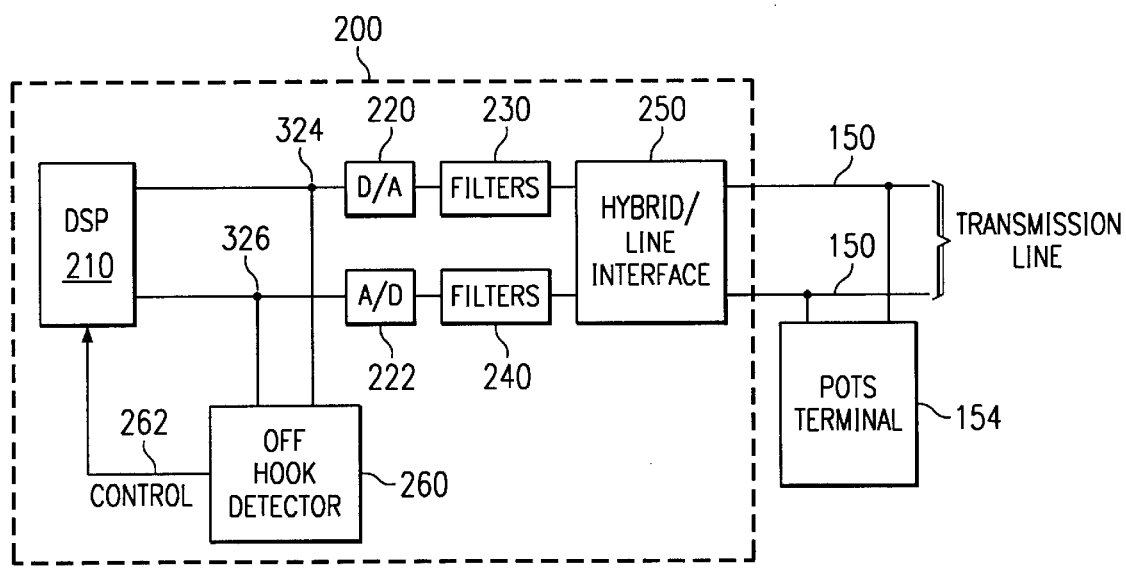
FIG. 3 is a block diagram of a DSL modem architecture according to a second embodiment.

As shown in FIGS. 2 and 3, the off-hook detector circuit 260 is coupled to the DSP 210 within the splitterless DSL modem 200 through a control line 262. The primary distinctions between the embodiments of FIGS. 2 and 3 is in the placement of the off-hook detector circuit 260. Thus, according to one embodiment, the off-hook detector circuit 260 is coupled to the hybrid line interface 250 and arranged to detect transients occurring at the transmission line side of the line interface 250.

According to another embodiment, the off-hook detector circuit 260 can be coupled to the transmit and receive paths of the DSP 210 at points 324 and 326 as shown in FIG. 3. It should be understood however that placement of the off-hook detector circuit 260 within the architecture of the splitterless DSL modem 200 can vary and that other arrangements will become apparent to those of ordinary skill in the art.

The present invention contemplates various means of accomplishing off-hook detection and of implementing the function of the off-hook detector circuit 260. For example, the off-hook detector circuit 260 can be configured to sense the presence of ring signals generated by the central office 110 over the transmission line 150. If so configured, the off-hook detector circuit 260 can include the appropriate ring detect circuitry and filter elements tuned to the expected ring signal amplitudes and frequency as generated by the central office 110.

In addition the off-hook detector 260 should be able to detect when the POTS device 154 goes off-hook independently and without the presence of a ring signal over the transmission line 150. As discussed in the Related Application, the transition to the off-hook steady state of the POTS device 154 causes a change in the transmission line impedance of the transmission line 150 as seen by the splitterless DSL modem 200. Accordingly, the off-hook detector circuit 260 can be configured with an integrated impedance analyzing function which is able to detect changes in the line impedance to the transmission line 150 as the voiceband device transitions from a first steady state to a second steady state.

In this way, the splitterless DSL modem 200 is capable of operating in any one of three states: the off-hook state of the POTS device 154, the on-hook state of the POTS device 154 and the transition state that occurs as the POTS device 154 changes between steady states. In one embodiment the splitterless DSL modem 200 stores a set of transmission line parameters corresponding to any one of the three states. For example, assuming the splitterless DSL modem 200 has previously calculated and stored a set of operating parameters corresponding to the off-hook state of the POTS device 154, the presence of a ring signal over the transmission line 150 can cause the DSP 210 to recall such off-hook transmission line parameters prior to a transition to the off-hook state of the POTS device 154. In this case, the loss of data into the DSL modem 200, i.e. from the ATU-C 130, is minimized.

In the case where the POTS device 154 goes off-hook for the first time, the DSP 210 is able to calculate the transmission line parameters for the first time, store and recall them as needed.

Where the POTS device 154 going off-hook without a ring signal appearing on the transmission line 150, the off-hook detector circuit 260 is able to detect the change in transmission line impedance and recall the off-hook transmission line parameters previously stored. In this case, however, it is expected that the splitterless DSL modem 200 may lose several frames of data as it transitions from one operating state to the next. Thus, the DSP 210 can be configured to request a retransmission from the ATU-C 130 at the central office 110. Once retransmission has occurred, all future communications can proceed using the off-hook transmission line parameters corresponding to the off-hook steady state of the POTS device 154.

According to the invention, the DSL modem 200 is likewise configured to avoid the effects of transients that occur as the POTS device 154 transitions from an off-hook steady state to an on-hook steady state. The off-hook to on-hook transition is similar to the transition to the off-hook state, with the splitterless DSL modem 200 is configured to recall and utilize the on-hook transmission profile previously stored. In either case the transition period between any of the steady states, while small in duration, occupies a finite amount of time. According to one embodiment, the DSL modem 200 is capable of computing, storing and recalling a set of transmission state operating parameters for use during the transition state.

Though the following method is directed specifically to an off-hook transient, it is understood that the method can be generally applied to the detection of any other transient, such as an on-hook transient. When a call is placed to a POTS device 154 attached to an ATU-R, a "ring" signal is generated through the transmission line 150. The off-hook detector circuit 260 can be utilized to detect ring signals prior to the POTS device 154 going off-hook. This provides a finite amount of time in which the splitterless DSL modem 200 can recall or compute off-hook transmission parameters prior to the actual occurrence of the off-hook transient and a change in the line impedance as seen by the splitterless DSL modem 200.

Thus the presence of ring signals on the transmission line 150 gives the splitterless DSL modem 200 time to prepare to deal with off-hook transient signal and changed condition of the transmission line 150 before they cause problems. In one embodiment, the splitterless DSL modem 200 can signal the ATU-C 130 at the CO 110 to give advance notice of the possible transition to the off-hook state, allowing the pair of devices 130,140 to reduce the data rate over the transmission line 150 or to enter a standby mode.

Figure 4:
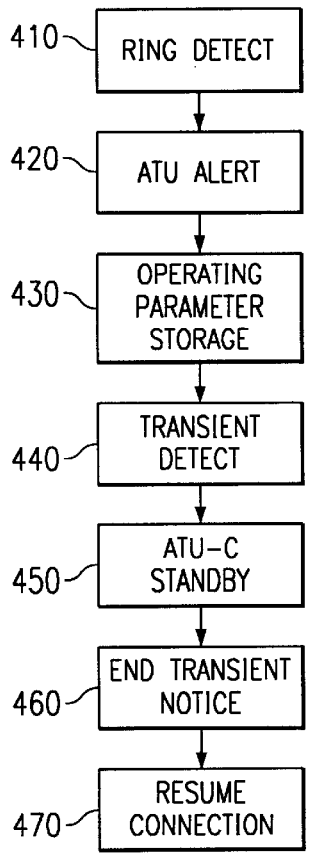
FIG. 4 is a process flow diagram illustrating a method of detecting a ring signal in a splitterless DSL modem.

FIG. 4 is a block diagram of the method of detecting a ring signal in a splitterless DSL modem according to one embodiment of the invention. During ring detect, step 410, the transient and ring detector circuit 260 of the DSL modem 200 senses a ring signal on a transmission line 150. Once a ring signal is detected, it is presumed that the POTS device 154 is about to go off-hook, so the ATU-R 140 splitterless DSL modem 200 is alerted that the POTS device 154 may go off-hook, step 420.

In response to the ATU-R alert, the ATU-R 140 will notify the ATU-C (possibly through the use of a pilot tone) and the modems will store the current operating parameters corresponding to the on-hook steady state of the POTS device 154 at step 430. For example, the current equalizer filter coefficients, frame alignment parameters and bit-loading parameters could be stored in a memory space (not shown) of the DSL modem 200.

If the POTS device 154 goes off-hook without a ring signal (i.e. about to place a call), an off-hook transient will be detected by the off-hook detector circuit 260, step 440. The ATU-R 140 can initiate an ATU-C 130 standby mode, step 450, wherein the ATU-C modem 130 ceases transmitting data until both devices 130, 140 can prepare themselves for off-hook steady state operation. The operating parameters are stored and the appropriate operating parameters for the second steady state (the off-hook state) are calculated according to the Related Application. If necessary, the ATU-C remains in standby mode (including a freeze on the timing recovery circuit) until the end of the off-hook transient is detected.

Next, the modems 130, 140 are instructed that the off-hook transient has terminated, step 460. Once the modems are informed that the off-hook transient is over, the appropriate parameters for steady-state off-hook operation are loaded, ATU-C standby mode ends, and the DSL connection is reestablished, step 470, which may place the modems in a reduced data rate mode which may lower the upstream throughput. Alternatively, should one or more frames of data be lost during the transition, the ATU-R 140 can request retransmission of the frames from the ATU-C 130.

Figure 5:
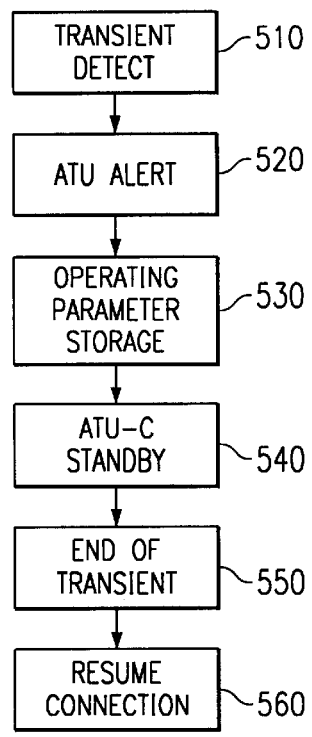
FIG. 5 is a process flow diagram illustrating a method of detecting transients other than ring signals over the wire line pair coupling the splitterless DSL remote modem to a central office modem.

When a connection or disconnection to the transmission line is initiated from a POTS terminal device which shares the same transmission line, no ring signal precedes the transient. FIG. 5 is a process flow diagram for a method of handling a transient when no ring signal is presented across the transmission line 150 common to the splitterless DSL remote modem 200 and the POTS device 154. In a transient detect step 510, the off-hook detector circuit 260 senses a transient on the transmission line 150 by noticing a change in voltage or impedance (or other transmission line characteristic) which signals that the POTS device 154 may go off-hook. Immediately thereafter, either the ATU-C 130 or ATU-R modem 140 (collectively, the modems) connected to the transmission line 150 are notified that a transient state is occurring at step 520.

In response to the ATU alert, the modems 130, 140 store the current set of operating parameters at step 530. For example, the current equalizer filter coefficients may be saved along with the frame alignment and bit-load parameters. Alternatively, the modems 130, 140 may simply shut down in a controlled manner for the estimated duration of the off-hook transient. Next, the ATU-C 130 can initiate standby mode, step 540, during which operating parameters appropriate for the second steady state (post-transient) may be calculated per the Related Application.

Once the operating parameters are stored and the ATU-C is placed in standby mode, the devices 130, 140 halt data transmissions until the end of the transient is detected and the modems are informed that the transient has terminated, step 550. Thereafter, the parameters corresponding to the second steady state are loaded, the ATU-C 130 leaves standby, and the DSL connection is reestablished, step 560. In one embodiment, the connection is reestablished at a lower upstream data rate. The ATU-R 140 can request retransmission of any data that was lost during transition.

While the invention has been described in conjunction with preferred embodiments, it should be understood that modifications will become apparent to those of ordinary skill in the art and that such modifications are therein to be included within the scope of the invention and the following claims.

What is claimed is:

1. A method of preventing a splitterless DSL modem from disconnecting due to a transient occurring across a transmission line coupling the modem and a POTS device to a central office facility, the method comprising the steps of:

detecting an incoming ring signal over said transmission line;

calculating a first set of operating parameters corresponding to a first steady state of the POTS device;

waiting for a transient signal to arrive over said transmission line, wherein said transient signal is associated with a transition of the POTS device to a second steady state;

calculating a second set of operating parameters corresponding to the second steady state of the POTS device; and utilizing the second set of operating parameters to prevent the DSL modem from disconnection from the transmission line.

2. The method of claim 1 further comprising the step of alerting a remote splitterless DSL modem within the central office facility that a transition to a second steady state may occur.

3. The method of claim 1 further comprising the step of entering a standby mode while the POTS device transitions to a second steady state.

4. The method of claim 1 further comprising the step of detecting the start of the transient signal.

5. The method of claim 1 wherein the step of storing a set of operating parameters stores at least the equalizer filter coefficients utilized by the splitterless DSL modem to communication over the transmission line.

6. The method of claim 1 wherein the step of storing a set of operating parameters stores at least the frame alignment coefficients utilized by the splitterless DSL modem to communication over the transmission line.

7. The method of claim 1 wherein the step of storing a set of operating parameters stores at least the bit-loading parameter utilized by the splitterless DSL modem to communication over the transmission line.

8. The method of claim 1 further including the step of sending a pilot signal over the link for detecting the transient.

9. The method of claim 1 further comprising the step of sending a pilot signal over the link for detecting a ring event.

10. A method of preventing a splitterless DSL modem from disconnecting due to a transient, during a communication session, across a link coupling the DSL modem to a central office facility, the method comprising the steps of:

detecting the start of a transient;

storing a first set of operating parameters corresponding to a first steady-state operating condition of the link;

calculating the a second set of operating parameters corresponding to a second steady-state operating condition of the link;

detecting the end of the transient; and resuming the communication session using the second set of operating parameters.

11. The method of claim 10 further comprising the step of alerting a remote splitterless DSL modem and a central office DSL modem that a transient state may occur.

12. The method of claim 10 further comprising the step of placing a central office modem on standby.

13. The method of claim 10 wherein the step of storing operating parameters stores at least an equalizer filter coefficient.

14. The method of claim 10 wherein the step of storing operating parameters stores at least a frame alignment.

15. The method of claim 13 wherein the step of storing operating parameters stores at least a bit-loading parameter.

16. The method of claim 10 further including the step of sending a pilot signal over the link for detecting the transient.

17. The method of claim 10 further comprising the step of sending a pilot signal over the link for detecting a ring event.

* * * * *